United States Patent Office 3,600,222
Patented Aug. 17, 1971

3,600,222
DRIED SUCROSE-CONTAINING PRODUCTS FROM SEPARATE FEEDS
Preston Leonard Veltman, Clarksville, Md., Johannes C. J. Verdonk, Zoog Zaandijk, Netherlands, and Lars Olav Thomsen, Viby, Aarlus, Denmark, assignors to W. R. Grace & Co., New York, N.Y.
Filed Nov. 25, 1969, Ser. No. 879,668
Claims priority, application Great Britain, Nov. 26, 1968, 56,144/68
Int. Cl. C13f *1/02, 3/00*
U.S. Cl. 127—30
12 Claims

ABSTRACT OF THE DISCLOSURE

A process for producing solid sugars wherein separate feeds of sucrose solution and of fine sucrose particles are dispersed in a current of heated air, whereby the particles are coated with the solution which is evaporated leaving a solid product containing substantially all the sugar fed to the process.

---

This invention relates to processes for the production of cane sugar (sucrose) and to the products obtained. Such products may or may not contain notable proportions of invert sugar, depending on the starting material used.

In the conventional methods of producing sucrose, the virgin syrup, as extracted from sugar cane or sugar beets, is first decolorised and deionised. The clarified syrup is then evaporated and fractionally crystallised in a series of precisely controlled steps, caramelisation being reduced as much as possible by the use of vacuum to reduce the evaporation temperature. Fractional crystallisation is essential since, during processing, inversion of the cane sugar takes place, usually to the extent of about 15% by weight of the original sucrose content by the time processing is completed. This invert sugar, which is substantially uncrystallisable, is discarded together with up to about 20% of non-recoverable sucrose and finds its way into commerce as animal feed or other low grade sugar products generally referred to as molasses.

We have found that virgin syrups or syrups containing notable proportions of invert sugar may be evaporated to the solid state to give a subtantially complete recovery of the sugar content in a form suitable for human consumption. Throughout the present description and claims such products will be referred to as edible sugars in contradistinction to low grade sugars fit only for animal feed.

According to the present invention, separate feeds of sucrose solution and of fine sucrose particles are dispersed in a current of heated air so that the particles become coated with the solution and water in the latter is evaporated to yield a solid product. The recovery of the sucrose is substantially 100% and moreover the process brings about substantially no inversion of the sucrose. The process may be applied to virgin cane syrups or to syrups containing notable proportions of invert sugar, e.g. the mother liquors from one of the fractional crystallisation stages of the conventional sugar process referred to above. In the former case the product consists of microcrystalline sucrose, while in the latter case the product consists of microcrystalline sucrose embedded in an amorphous matrix formed of a mixture of sucrose and invert sugar. This matrix may well correspond with the uncrystallisable product obtained at the end of series of fractional crystallisations in the conventional sugar process.

Figure 1:
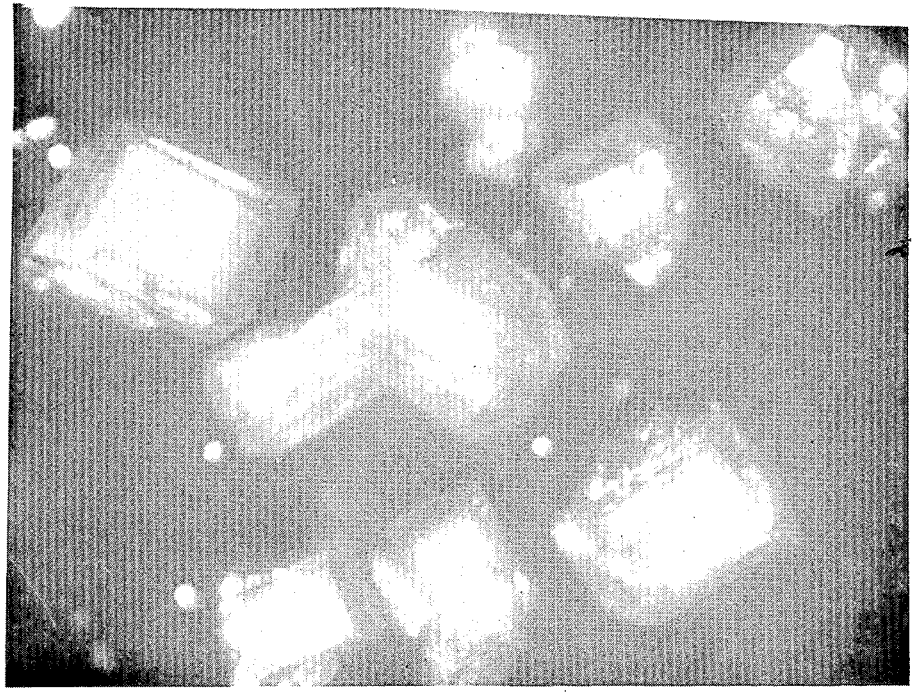
Figure 2:
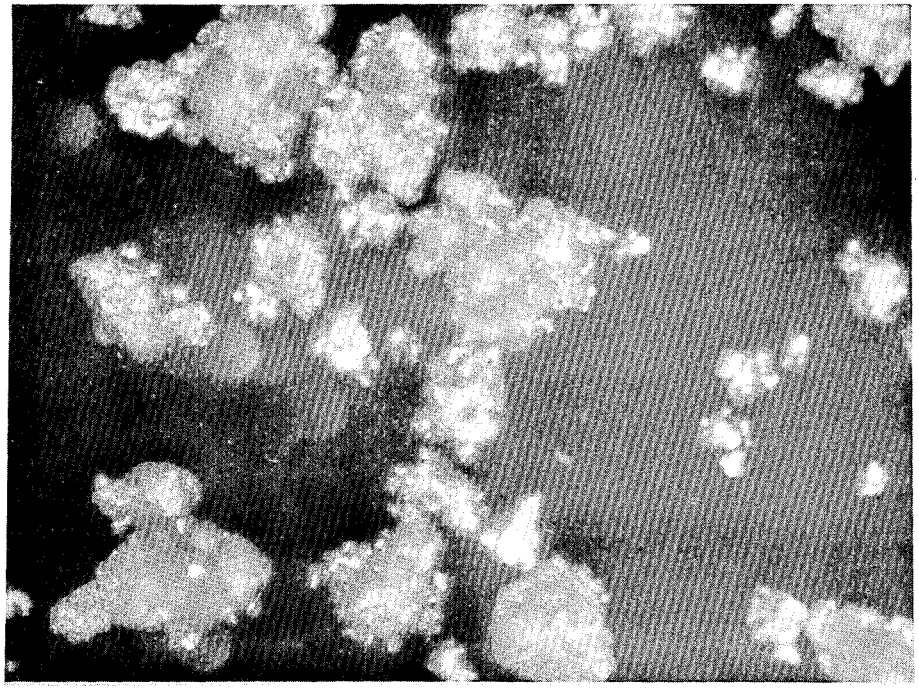
Figure 3:
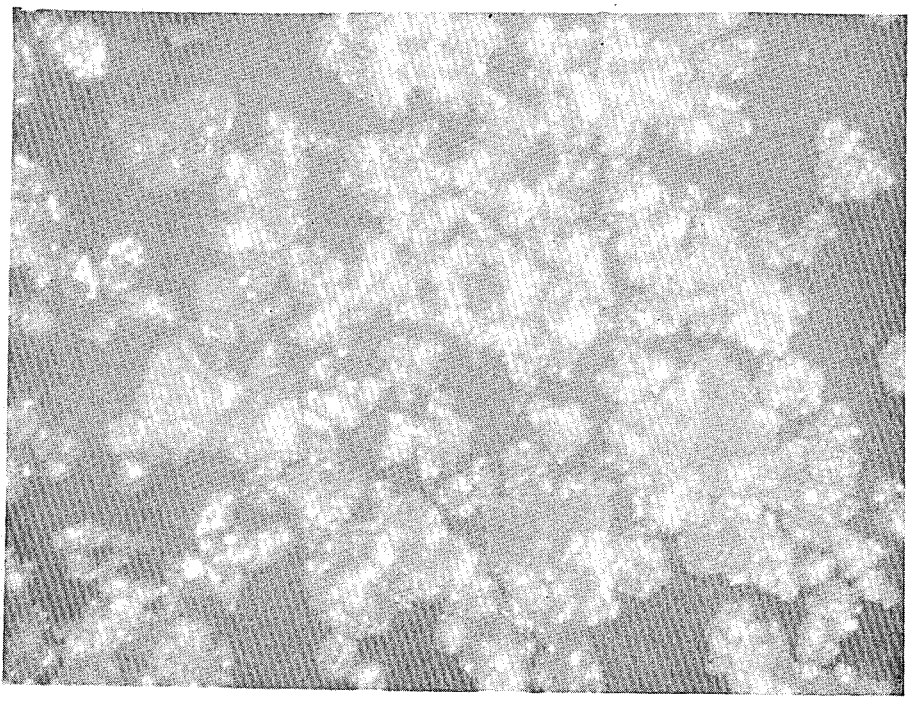

FIGS. 1, 2 and 3 of the accompanying drawings are photo-micrographs,

FIG. 1 being of commercial cane sugar, which is shown to be 100% crystalline, each particle being a single crystal, and FIGS. 2 and 3 being photo-micrographs of products of a run carried out according to the invention starting with a syrup containing both sucrose and invert sugar. These products are agglomerates ranging in size from about 1,000 microns (roughly the size of the individual crystals of commercial cane sugar) down to about 50 microns. The agglomerates consist of clusters of microcrystals of sucrose held together by a matrix consisting of an amorphous matrix of invert sugar and sucrose.

When clarified virgin syrup is used as starting material the product consists almost wholly of agglomerates of microcrystalline sucrose.

The products of the invention are free flowing solids which may be stored and utilised in a manner similar to crystallised sucrose of commerce. Their free flowing and ready solution properties make them particularly useful in the manufacture of chocolate and other confectionery and in the production of soft drinks. The agglomerates are readily friable and break up quite quickly in any single mixing process. They may therefore be fed directly as agglomerates to operations requiring a feed of very finely divided sugar. Examination of the products using conventional X-ray diffraction techniques indicates that the products have a crystallinity ranging from about 45% to about 85%. Useful edible products may be obtained from starting materials containing as much as 20% of invert sugar based on the total sugar present. The bulk density of the present products is markedly different from that of commercial crystallised sucrose. Thus while the latter has a bulk density of about 50 to 55 pounds per cubic foot, the bulk densities of the present products range from about 30 to about 43 pounds per cubic foot.

It is an important feature of the present process that the solid sugar used in the drying operation is of sufficient quantity and in a sufficiently fine form to provide sufficient surface to take up all, or substantially all, of the droplets syrup as a thin layer on the surfaces of the solid component. In addition the solid sugar should be distributed as uniformly as possible within the spray drying apparatus. In this way evaporation of water from the syrup can be made to take place very rapidly. Sticking together by the syrup of a number of solid particles and consequent shielding of the syrup from the evaporative action of the heated air is reduced to a minimum. In practice it has been found that when using an aqueous mixture (syrup) containing 60–70% by weight of cane sugars the ratio of 1 to 4 preferably 2 to 3 parts by weight of finely divided solid sugar to one part by weight of solid content of syrup gives good results. Other concentrations of syrup may be used, for example, solutions which contain as much as 80 to 90% by weight sugar. Such solutions have to be used hot to prevent premature crystallisation. The preheating of the syrup is generally advisable in that it is more economical to preheat the syrup than to supply the same amount of heat by way of hot air. Preheating of the syrup reduces the viscosity so that finer drops may be formed.

Once the process has been started the solid particles of sugar may be and preferably are provided by recycle of part of the product after a light grinding if necessary so as to break up any agglomerates having an undesirable size. In the initial starting of the process a commercial grade of sucrose may be utilized, or if desired a store of the present product obtained by way of a previous operation may be used. If commercial sugar is utilized as a starting material, the concentration of the commercial sugar is subsequently minimized by operating the unit on recycle material.

The rate of flow and the temperature of the hot air are conditioned by the consideration of advancing the solidification (crystallisation) of the syrup as far as possible by the time the particles carrying the syrup reach the end of their travel in the spray drying chamber. In practice, temperatures of the order of 100 to 150° C. for the inlet air have given satisfactory results. A better criterion for practical purposes is to arrange or adjust the inlet air temperature and its rate of flow through the chamber so that air at the outlet has a temperature of the order of 55 to 75° C. Using this criterion, discoloration of the product is almost entirely absent. However, as seen in the following examples, outlet air temperatures ranging from as low as 45° C. to as high as 105° C. can be employed with satisfactory results. In the earlier stages overheating is prevented by cooling due to evaporation of water.

Figure 4:
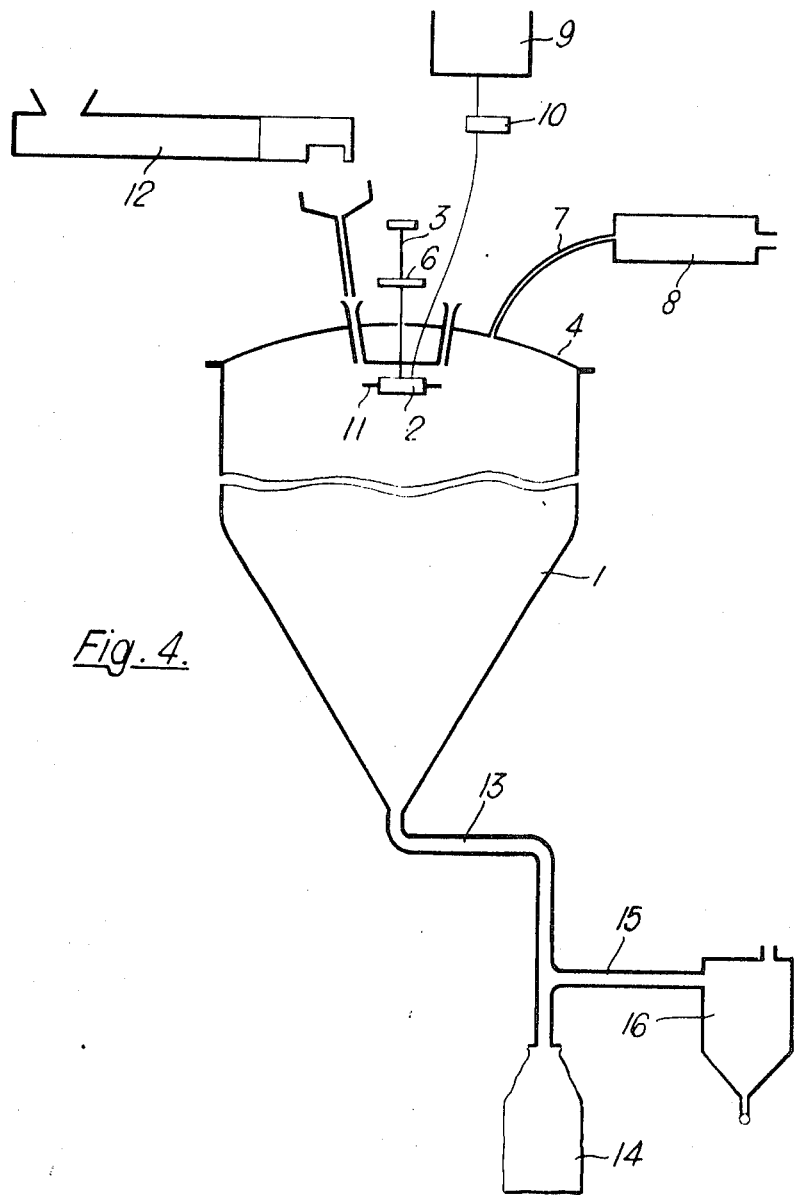

We prefer to use for the process a centrifugal type spray drying apparatus such as shown in FIG. 4 of the accompanying drawings. Referring to FIG. 4, the spray dryer 1 is provided with a centrifugal spray disc 2 carried by spindle 3 to the cover plate 4 and driven by suitable means not shown through pulley 6. Line 7 carries air from a heater 8 into the tower either by suction from the delivery end of the tower or by a fan in the heater line. Syrup from a container 9 is fed at a measured rate by a metering pump 10 to a well formed in the upper surface of the disc 2. Leading radially from this well are two or more bore holes which lead to the outer edge of disc 2. The bore holes are terminated by fine metal tubes 11 having an inside diameter of about 2 to 4 mm. A screw conveyor 12 delivers recycle sugar at a measured rate to a point just above the level of the rotating disc 2 and the air currents created by such rotation serve to scatter the powder more or less uniformly through the mist of syrup droplets thrown from the disc. A distributor or baffle plate may be fitted at the top of the device to cause the powder to fall in a circle and form a cylindrical curtain of particles outside the effective orbit of tubes 11 on disc 2.

The tower 1 tapers at its lower end and is connected to a trunk 13 leading to collecting vessel 14. A side trunk 15 leads to a cyclone separator 16 which serves to retain the finest particles of product and which also serves to provide suction to draw air through the system.

In operation, we find that the rotational speeds of the disc which give orbital speeds at the outer ends of tubes 11 of 8,000 to 11,000 meters per minute give very satisfactory results with syrups containing about 70% sugar. Slightly higher speeds may be advisable with more viscous syrups, for example solutions which contain 80 to 90% by weight sugar.

Another type of atomizing disc which may be employed which is not shown in the drawing possesses an upstanding peripheral flange bored with a series of rectangular holes having dimensions of 6 x 12 mm. (disc diameter 150 mm. and number of holes about 30).

Powdered sugar being fed to the well within the flange is thrown out through the radical hole, thus giving a very uniform distribution of particles. Syrup is fed through a hollow driving spindle to a cavity within the main body of the disc and ejected by centrifugal force through bore holes from the periphery to the cavity. Peripheral speeds of the same order as those mentioned above are suitable for operation for this type of disc.

Using the apparatus illustrated in the drawing we find that removal of water from syrup is substantially complete in a very short time. A few seconds residence time in the apparatus appears to be sufficient. Crystallisation, on the other hand, is somewhat delayed. Thus, some of the material thrown against the sides of the drawing tower adheres to it. However, as crystallisation proceeds the material adhering to the side of the tower tends to flake off and fall to the bottom of the tower. This material represents product in the form of relatively large agglomerates which when crystallisation is complete is readily broken up. The remaining material flows gently down the tower and when viewed through a sight glass, has the appearance of a miniature snow storm. The material settling at the bottom is readily removed therefrom in the form of very small agglomerates, generally less than one mm. in diameter and the remainder in the form of finely divided powder. If crystallisation is not complete when the material is withdrawn from the apparatus, crystallisation and solidification occurs quickly if the product is left in the open air or if subsequently swept by a current of cooling air while spread out in thin layers.

Although the use of centrifugal type spray drying apparatus is preferred, nozzle spraying apparatus can also be used.

As has been previously indicated, the present product is in the form of a finely divided powder or clumps of readily disintegrated product. The present material possesses considerable advantages when used in the manufacture of chocolate both with regard to the quality of the final product and as to the ease of processing particularly in the refining step. The relative ease with which the new products may be incorporated or assimilated with other materials, particularly cocoa or chocolate liquor is in no doubt attributable in part to the fine particle size as well as the free flowing properties, high rate of dispersion, the porosity, the low bulk density of the agglomerates and the fact that the new products exhibit little or no tendency to cake.

The novel solubility characteristics of the present sugar products can be readily appreciated by placing a small amount of the powder on the tip of the tongue. Solution is so rapid as to give the impression of a slight sharpness whereas in fact the sweeting properties are substantially the same as conventional sucrose. These same properties also facilitate the incorporation of the sugar with food products other than chocolate.

The present process may be applied to the production of particulate sugars from a wide variety of raw materials. For example, edible molasses, raw sugar syrups and total beet or cane syrups. It is also contemplated that solutions of sugars obtained in conventional sugar refining operations after the second, third or final crystallisation, i.e. strike syrups, may be utilized in our process. In all cases where a pure white product is desired, raw materials should where necessary be given a decolorization treatment such as with activated carbon and deionization. Also, the initial materials may be subjected to an evaporation or dilution step to provide a concentration suitable for process in the equipment available. Generally, it is found that the initial starting syrups will contain from about 1 to 20 percent invert based on the total sugar content present in the syrup.

Unlike conventional processes for sugar manufacture, the present process does not give rise to any substantial inversion of the sucrose initially present in the syrup. Thus, when starting with a raw material containing a given concentration of invert sugar no subsequent increase invert content is noted due to the presently intended processing methods. It is noted that the present novel process provides a method for recovering substantially all the sugars present in a given raw material. This is in contrast to conventional sucrose processing procedure which employs a series of concentration of crystallisation steps which recovers only about 70 to 80 percent of the sucrose originally present as a particulate dry salable commodity. In typical prior art operations from 20 to 30 percent of the sugars present in the initial cane extract is disposed of as low grade low priced products unsuitable for human consumption.

The following examples illustrate the invention:

EXAMPLE I

A series of runs were conducted wherein various sugar syrups were subjected to the process. The apparatus utilized comprised a spray drying device such as that set forth in FIG. 4 of the drawing. In all, 11 runs were conducted, the operating details of which are summarized in Table I below. In Run 1 the liquid component added comprised water with no added sucrose or invert. Run 2 utilized a syrup which contained only sucrose. Runs 3-7 utilized a syrup which contained sucrose along with a varying amount of invert. In Runs 1-5 sucrose was utilized as the initial particulate solid introduced into the spray drying apparatus.

In Runs 8, 9, 10 and 11 various natural sugar solutions such as raw sugar dissolved, refined cane syrup and virgin cane syrup were utilized. In Runs 7, 8, 9, 10 and 11 the initial recycle material used to start the run was derived from previous runs. In all runs a recycle ratio of about three parts by weight of particulate solid per one part by weight solids present in the syrup solution was utilized. In order to check the progress of the spray drying operations throughout the runs a number of recycles were conducted as indicated in the last column of Table I. A recycle comprised operating the unit with 100 pounds of dry material at a recycle ratio of 2 to 1. Subsequently, in the next recycle 100 pounds of dry material obtained from the previous cycle was passed through the apparatus.

in the preparation of conventional coating-chocolate compositions.

A series of three compositions were prepared each of which contained the following ingredients:

| Component: | Percent by weight |
|---|---|
| Chocolate liquor | 39.120 |
| Sugar | 48.840 |
| Lecithin | 0.350 |
| Ethyl vanillin | 0.208 |
| Salt | 0.625 |
| Van bean base | 0.938 |
| Cocoa butter | 11.513 |

The sugar component in the three samples constituted (A) cane sugar (FIG. 1), (B) sugar of Run 9 (FIG. 2), and (C) sugar of Run 10 (FIG. 3). To prepare the compositions the following procedure was used.

Sample A—A conventional sucrose was subjected to dry milling to obtain a powdered sugar. The sugar was then combined in a conventional mixing apparatus with the remaining ingredients.

Sample B—The sugar of Run 9 was combined without intermediate milling with the remaining ingredients.

Sample C—The sugar of Run 10 was combined with

TABLE I

| Run No. | Feed Syrup, °Bx. | Invert, percent | Initial recycle | Air volume, m.³/hr. | Inlet air | Temperatures, °C. Outlet air | Feed | Tower | Product | Test time, hrs. | Number of recycles |
|---|---|---|---|---|---|---|---|---|---|---|---|
| 1 | 0 | 0 | Sucrose | 2,200 | 135 | 60 | 20 | 130 | 72 | 0.6 | 1 |
| 2 | 68 | 0 | do | 2,200 | 140 | 70 | 55 | 112 | 80 | 5.3 | 5 |
| 3 | 70 | 7.25 | do | 2,200 | 110 | 45 | 75 | 80 | 65 | 5 | 5 |
| 4 | 69 | 14.6 | do | 2,200 | 110 | 45 | 70 | 80 | 65 | 5 | 5 |
| 5 | 68 | 19.2 | do | 2,200 | 110 | 45 | 80 | 85 | 85 | 4.6 | 4 |
| 6 | 67 | 5.6 | do | 1,500 | 185 | 105 | 70 |  | 85 | 4.3 | 4 |
| 7 | 69 | 15.1 | 4 | 1,600 | 150 | 90 | 70 | 95 | 70 | 19 | >15 |
| 8 | a 70 | 4.0 | 4 | 2,100 | 120 | 60 | 80 | 100 | 80 | 4.2 | 5 |
| 9 | b 68 | 23.1 | 4 | 2,100 | 110 | 55 | 80 | 90 | 80 | 2 | 4 |
| 10 | c 68 | 0.58 | 4 and 6 | 2,100 | 110 | 55 | 75 | 85 | 75 | 2 | 4 |
| 11 | d 70 | 3.5 | 6, 9 and 10 | 2,100 | 115 | 60 | 80 | 90 | 75 | 2.5 | 5 | a Raw sugar.
b Refined cane.
c High-grade syrup.
d Virgin cane.

EXAMPLE II

In order to determine the characteristics of the present novel products samples of product obtained from Runs 1-11 were analyzed to determine moisture, i.e. percent dry material, invert concentration, and particle size distribution as evidenced by sieve analysis.

Also the percent crystallinity of each product was determined using conventional X-ray diffraction techniques wherein a commercial sample of crystalline sucrose was utilized as a standard to represent 100% crystallinity. The results of these analyses are set forth in Table II.

the remaining ingredients and mixed.

To determine the characteristics of the products identified as Samples A, B, and C, the finest of the particle sizes in the mixture, viscosity and fat content were determined, and are set forth in Table III below.

TABLE III

| Sample | Fine (microns) | Viscosity (cps.) | Fat (percent) |
|---|---|---|---|
| A | 10 | 123 | 34.1 |
| B | 10 | 124 | 34.1 |
| C | 10 | 136 | 35.8 |

TABLE II

| Product of Run No. | Percent Dry substance | Invert | Sieve analysis, microns >1,000 | >500 | >250 | >150 | >75 | <75 | Percent crystallinity |
|---|---|---|---|---|---|---|---|---|---|
| 1 | 99.95 | <1 |  |  |  |  |  |  | 85 |
| 2 | 99.5 | <1 |  |  |  |  |  |  | 85 |
| 3 | 99.3 | 6.5 |  |  |  |  |  |  | 60 |
| 4 | 99.1 | 10.6 |  |  |  |  |  |  | 55 |
| 5 | 99.1 | 14.3 |  |  |  |  |  |  | 70 |
| 6 | 99.2 | 3.3 | 2.6 | 1.6 | 6.2 | 42.2 | 40.0 | 7.8 | 60 |
| 7 | 99.1 | 11.5 | 2.8 | 13.4 | 56.8 | 24.0 | 2.8 | 0 | 60 |
| 8 | 99.2 | 7.1 | 0.2 | 2.0 | 11.6 | 34.6 | 44.0 | 8.4 | 85 |
| 9 | 99.3 | 16.2 | 5.9 | 11.8 | 36.8 | 35.2 | 11.0 | 0.2 | 70 |
| 10 | 99.1 | 5.2 | 1.8 | 3.6 | 15.8 | 37.4 | 40.0 | 1.8 | 60 |
| 11 | 98.9 | 5.7 | 4.2 | 2.2 | 5.8 | 24.8 | 62.2 | 1.6 | 55 |

EXAMPLE III

To illustrate the utility of the present invert-sucrose sugar product in the manufacture of sweetened chocolate, the sugar products obtained by way of Runs 9 and 10 were compared with conventional crystalline sucrose To determine the suitability of the above compositions as coating for candy, caramel centers were coated with the composition using a standard technique and the quality thereof judged using conventional standards. The procedure involved in coating the centers comprised first melting three pounds of the coating composition in a saucepan, and subsequently cooling the coating to 80° F. while maintaining agitation. Subsequently, the coating composition was heated to a temperature of 89° F. and agitated for 30 seconds. The caramel centers were dipped in the coating and subsequently placed in a cooling tunnel which was maintained at a temperature of 54° F. The initial coatings produced by all three samples were found to possess uniform and acceptable characteristics. To test the ageing characteristics of the coatings, the coated candy was subjected to a cycling test and a controlled temperature chamber. The temperature within the chamber was cycled three times for a period of 16 hours at 67° F., 50% relative humidity, followed by 8 hours at 85° F. at 50% relative humidity.

Subsequent to cycling under these conditions, it was found that the coatings B and C which contained non-milled sugar of the present invention, possessed quality and appearance similar to that set forth in the control sample A.

The invention, in addition to producing products having new and advantageous properties, has substantial economic advantages in that substantially the whole of the sugar content of the starting materials is recovered in an edible solid form, the processing time is reduced to seconds rather than hours with substantial avoidance of caramelisation, and the necessity for heavy evaporating and crystallising pans coupled with means for applying vacuum conditions is eliminated.

We claim:
1. A process for preparing solid sugars which comprises
   (a) dispersing in a current of heated air separate feeds of sucrose solution and of fine sucrose particles;
   (b) evaporating the water from the sugar solution coated on the particles,
   (c) recovering the coated particles from said air stream, and
   (d) maintaining the outlet air temperature within the range of 45–105° C.
2. A process according to claim 1 wherein said fine sucrose particles are recycle products from step (c).
3. A process according to claim 1 wherein said sucrose solution comprises decolorised and deionised virgin cane syrup.
4. A process according to claim 1 wherein the outlet air temperature is in the range of 55–75° C.
5. A process according to claim 1 wherein the weight ratio of solid fine sucrose particles to the solids in said sucrose solution is in the range of 1 to 4.
6. A process according to claim 1 wherein the weight ratio of said fine sucrose particles to the solids in said sucrose solution is in the range of 2 to 3.
7. A process according to claim 1 wherein said sucrose solution comprises virgin cane syrup.
8. A process according to claim 1 wherein said sucrose solution comprises dissolved raw sugar.
9. A process according to claim 1 wherein said sucrose solution comprises decolorised and deionised sucrose syrup containing a notable proportion of invert sugar.
10. A composition prepared by the process of claim 9 having a crystallinity of from about 45% to about 85%.
11. A process according to claim 1 wherein said sucrose solution comprises sucrose syrup containing a notable proportion of invert sugar.
12. A composition prepared by the process of claim 11 having a crystallinity of from about 45% to about 85%.

References Cited

UNITED STATES PATENTS

| 2,728,678 | 12/1955 | Sharp | 99—199 |
| 3,143,428 | 8/1964 | Reimers | 127—30X |

FOREIGN PATENTS

| 965,968 | 8/1964 | Great Britain. |

JOSEPH SCOVRONEK, Primary Examiner

S. MARANTZ, Assistant Examiner

U.S. Cl. X.R.

127—15, 61, 62, 63